(No Model.)

J. McVICKAR.
CHERRY PITTING MACHINE.

No. 312,370. Patented Feb. 17, 1885.

WITNESSES:
Otto Beyer
C. Sedgwick

INVENTOR:
J. McVickar
BY
Munn & Co.
ATTORNEYS.

UNITED STATES PATENT OFFICE.

JAMES McVICKAR, OF CALDWELL, NEW JERSEY.

CHERRY-PITTING MACHINE.

SPECIFICATION forming part of Letters Patent No. 312,370, dated February 17, 1885.

Application filed April 9, 1884. (No model.)

*To all whom it may concern:*

Be it known that I, JAMES McVICKAR, of Caldwell, Essex county, State of New Jersey, have invented a new Cherry-Pitting Machine, of which the following is a full, clear, and exact description.

Reference is to be had to the accompanying drawings, forming a part of this specification, in which similar letters of reference indicate corresponding parts in all the figures.

Figure 1:
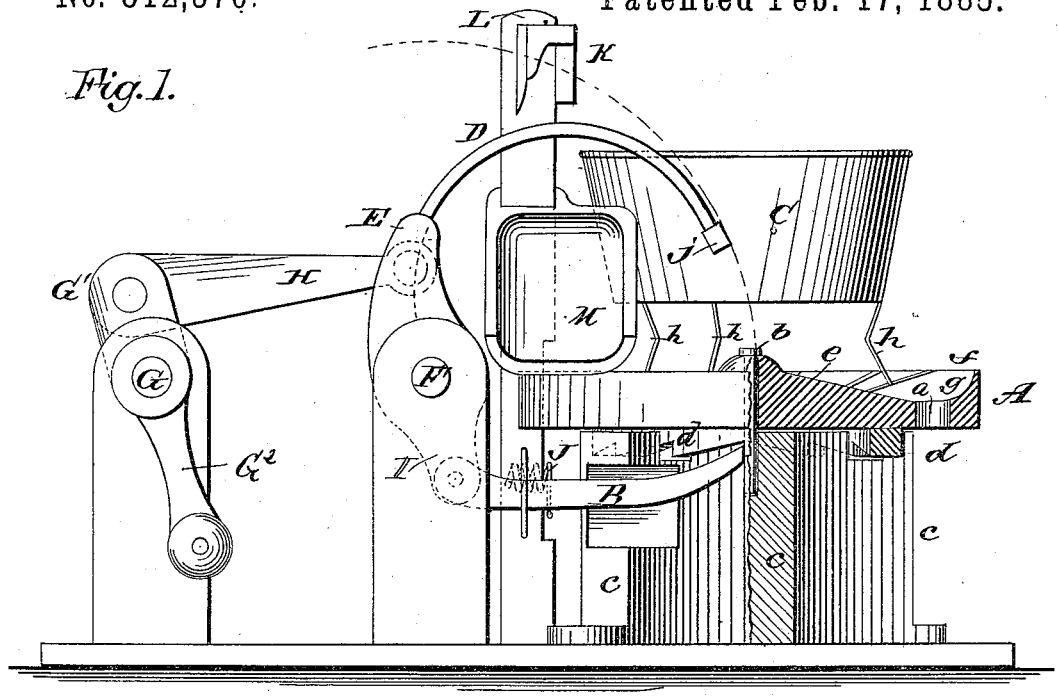
Figure 2:
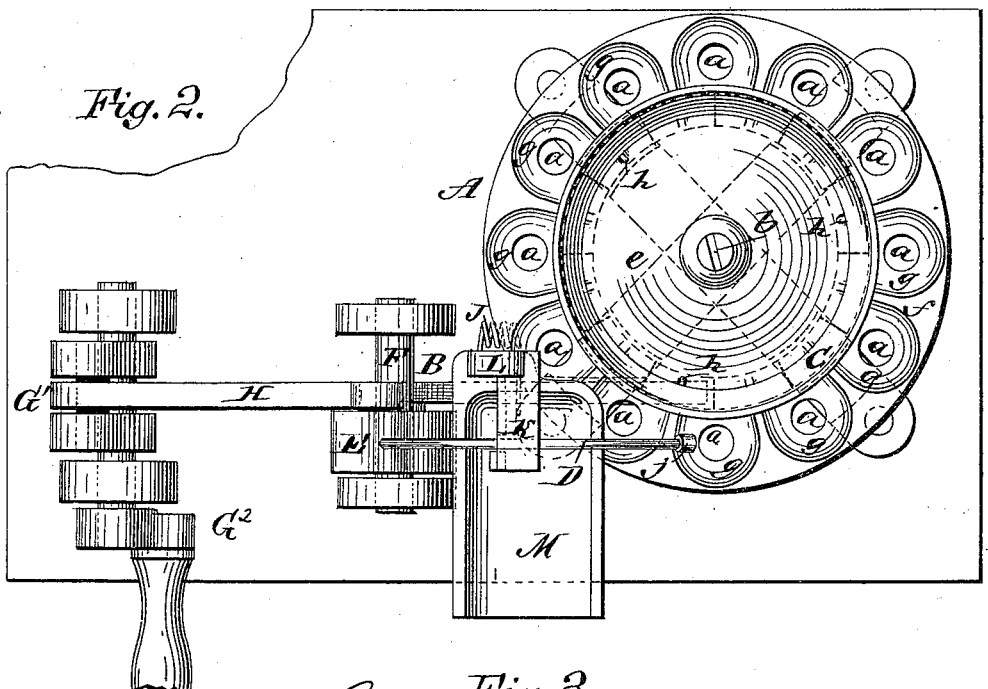
Figure 3:
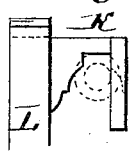

Figure 1 is a sectional side elevation of my new and improved cherry-pitting machine. Fig. 2 is a plan view of the same, and Fig. 3 is a detailed view showing the device for detaching the cherry from the reciprocating arm.

The invention will first be described in connection with the drawings, and then pointed out in the claims.

A is a circular table, formed with the series of apertures $a$ near its edge. This table A is centrally pivoted upon the vertical stud $b$, held by the upright pieces $c$. Upon its lower surface the table A is formed or provided with the circular ratchet $d$, with which the pawl B engages for intermittently revolving the table A.

From the apertures $a$ to its center the table A is inclined or made conical, as shown at $e$, while at its outer edge it is formed with the lip $f$; and around each of the apertures $a$ the table A is countersunk, as shown at $g$, for causing the cherries to center themselves in the apertures $a$ as they are fed upon the table A from the hopper C, held a little above the center of the table A by the wires or small rods $h$.

D is a reciprocating arm arranged to strike through the openings $a$ in the table A for puncturing the cheries and forcing the pits out of them and down through the openings $a$. This arm D might be made straight, and be arranged above the table A and reciprocated vertically, but I prefer to make it curved, and to attach it to the upper end of the upright arm E, attached to or formed upon the shaft F, and to reciprocate it and the shaft F by the crank-shaft G, the crank G' of which is connected to the arm E by the pitman H. The pawl B is pivoted to the downwardly-projecting arm I, attached to or formed upon the shaft F, and is held pressed upward at its free end in contact with the ratchet $d$ by the spring J, so that as the shaft F is rocked or receives a rotary reciprocation by the revolution of the crank-shaft G the pawl B will act to revolve the table A intermittently, so as to bring the apertures $a$ successively in line with the arm D, so that the head $j$ of the arm will strike into and through the apertures $a$.

K is an overhanging device attached to the upright L and arranged so that the arm D will strike through it for detaching the cherries from the arm D after the pit has been removed, and M is a spout attached to the said upright L beneath the detaching device K for conducting the pitted cherries as they drop from the arm D to a suitable receptacle to be placed under the spout.

The action of the machine is as follows: The cherries to be pitted will be placed in the hopper C, from which they will pass upon the inclined central portion, $e$, of the table A, and will roll down into the apertures $a$. The crank-shaft G now being revolved by the crank $G^2$, the arm D will be reciprocated. In its downstroke the arm D will strike the cherry held in the aperture $a$ that is in line with the stroke of the arm D, and the head $j$, which is slightly concaved upon its end, will pass through the cherry and force out the pit, which will drop through the aperture $a$, while the pulp portion of the cherry will remain upon the head $j$ of the arm D, and will be carried up with the arm D until the head $j$ reaches the detaching device K, which, being too narrow for the passage of the cherry, will cause the cherry to be stripped off from the arm D, when it will drop upon the spout M, and from thence will roll into a receptacle placed to receive it. The arm D having reached the limit of its upward and backward movement, the pawl B will in the meantime have been forced forward by the arm I, causing it to turn the table A a sufficient distance only to bring another aperture $a$, containing a cherry, in line with the arm D ready to be pitted by the next downstroke of the arm D, and in like manner removed by the device K during the upward movement of the arm D. This operation will be repeated, pitting a cherry with each revolution of the crank-shaft G, so that the machine is adapted for very rapid operation, and the cherries being held in small apertures in direct line with the thrust of the arm D the pits will be removed with less mutilation and waste of the pulp than can be done by hand.

Having thus described my invention, I claim as new and desire to secure by Letters Patent—

1. The table A, formed with the apertures a, and having the hopper C held above it, said hopper being supported upon the rods h, secured to said table, substantially as and for the purposes set forth.

2. The apertured circular and centrally-pivoted table A, provided with ratchet d, the pawl B, and reciprocating arm D, attached, respectively, to the arms I E of the shaft F, in combination with the crank-shaft G and connecting-rod H, all arranged to operate substantially as and for the purposes set forth.

JAMES McVICKAR.

Witnesses:
H. A. WEST,
C. SEDGWICK.